Figure 1:
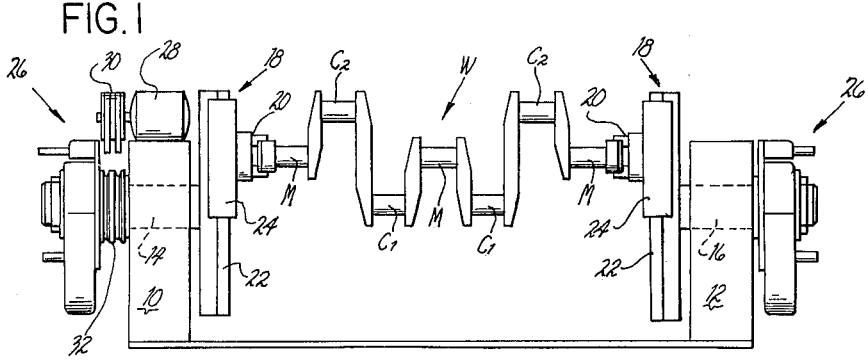

Sept. 21, 1965   F. P. HEALY ET AL   3,207,001
COUNTERBALANCING MECHANISM FOR A CRANKSHAFT GRINDING MACHINE
Filed Nov. 7, 1962   2 Sheets-Sheet 1

*INVENTOR.*
FRANCIS P. HEALY
EDWARD A. ALLEN

BY *Jeller, McCormick, Paulding & Huber*

ATTORNEYS

Sept. 21, 1965   F. P. HEALY ET AL   3,207,001
COUNTERBALANCING MECHANISM FOR A CRANKSHAFT GRINDING MACHINE
Filed Nov. 7, 1962   2 Sheets-Sheet 2

United States Patent Office 3,207,001
Patented Sept. 21, 1965

3,207,001
COUNTERBALANCING MECHANISM FOR A CRANKSHAFT GRINDING MACHINE
Francis P. Healy, Springfield, and Edward A. Allen, Westfield, Mass., assignors to Universal American Corporation, Springfield, Mass., a corporation of Delaware
Filed Nov. 7, 1962, Ser. No. 236,018
4 Claims. (Cl. 74—603)

This invention relates to an improved counterbalancing mechanism for machine tools and, more particularly, to a counterbalancing mechanism for a crankshaft grinding machine.

A balance problem is countered in the design and constructed of machine tools that are provided to perform work on the main bearings and crank pins of a crank shaft, and one such machine tool is a crankshaft grinding machine. Machines of this type comprise a head stock and a tail stock each of which rotatably supports a horizontal spindle, the said stocks being spaced apart so that the inner ends of the spindles face toward each other and are located on the same axis. A chuck mechanism including a radially adjustable chuck is supported on the inner end of each spindle, and the chucks are adapted to grip the opposite ends of a crankshaft which are formed coaxially with the main bearings of the crankshaft. Thus, when a crankshaft is engaged and gripped with the chucks located on the common spindle axis, and when one or both of the spindles are driven to rotate the chuck mechanisms and the engaged crankshaft, the crankshaft is rotated on the axis of its main bearings, which axis then coincides with the common axis of the spindles. Under such operating conditions, there is usually no balance problem encountered because the crankshaft is usually in static and dynamic balance around the axis of its main bearings, and the chuck mechanisms and other rotating parts of the machine tool can be provided in such form as to be substantially in static and dynamic balance when the chucks are in coaxial positions with respect to the respective spindles. Under the aforedescribed operating conditions, the main bearings of the crankshaft can be engaged and ground by a rotating grinding wheel as the crankshaft is being slowly rotated.

However, when the chucks are shifted away from the spindle axis to support the crankshaft so that upon rotation of the spindles the crankshaft will be rotated around the axis of one or more of its crankpins, it will be seen that a mass has been shifted in one radial direction away from the axis of rotation and that a balance problem arises.

It is the general object of the present invention to provide a counterbalancing mechanism that includes counterweights that are adjustable to become effective to balance the "off center" mass of the rotating structures when a counterbalance is needed, and which counterweights will be positioned to balance out each other and thus be of no net effect when there is no need to balance the rotating structures in the machine.

It is a further object of the invention to provide a counterbalancing mechanism of the aforementioned type which is particularly adapted for location on the outer end of each spindle of the machine and which is so constructed and arranged that it can easily be adjusted to suit the different operating requirements of the machine and the workpieces being operated upon.

The drawings show a preferred embodiment of the invention and such embodiment will be described, but it will be understood that various changes may be made from the construction disclosed, and that the drawings and description are not to be construed as limiting the scope of the invention, the claims forming a part of this specification being relied upon for that purpose.

Figure 2:
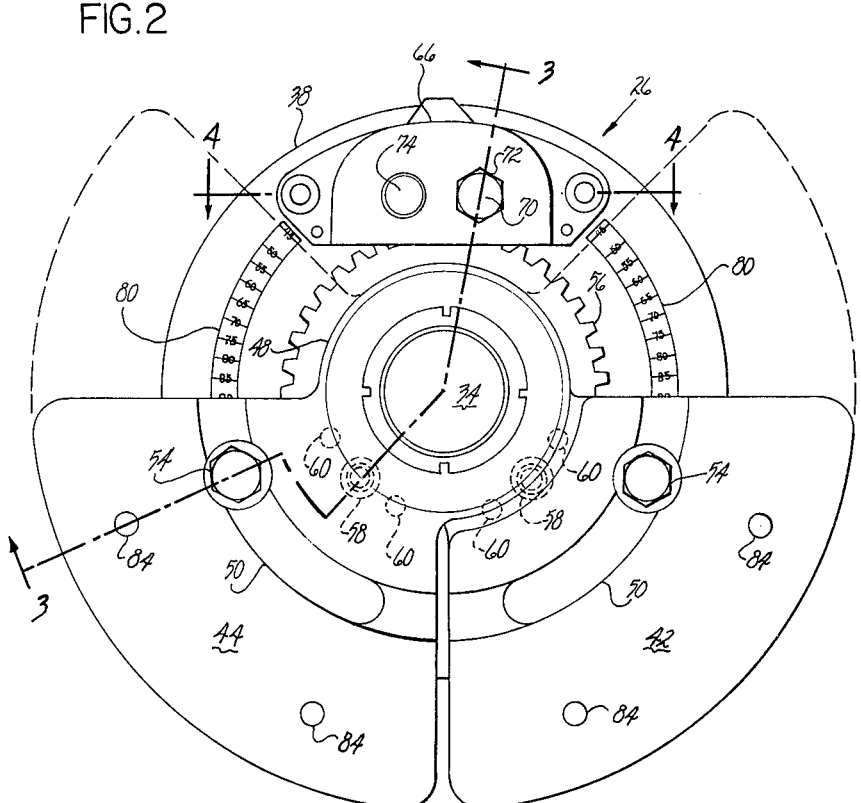
Figure 3:
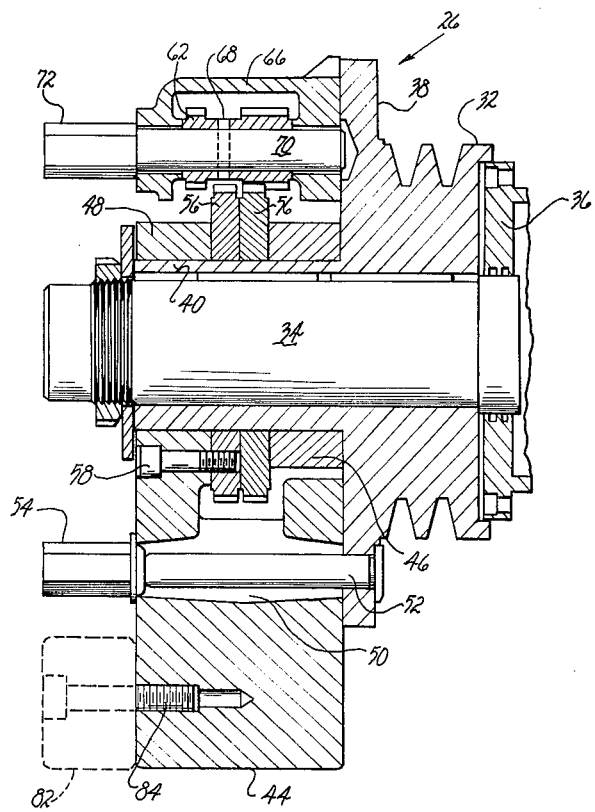
Figure 4:
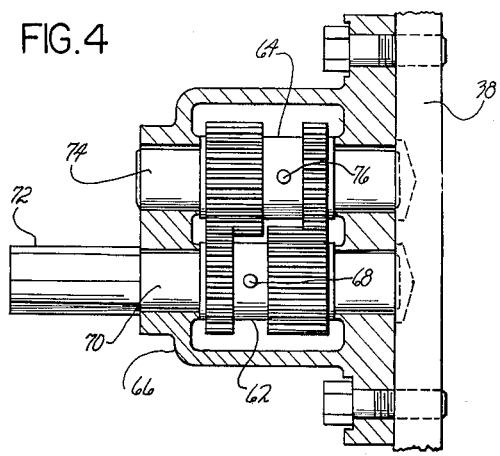

Of the drawings:
FIG. 1 is a generally schematic illustration of a crankshaft grinding machine incorporating the counterbalancing mechanism of the present invention;
FIG. 2 is an enlarged view of the outer end of one spindle and the counterbalancing mechanism associated therewith;
FIG. 3 is a multi-plane cross sectional view taken longitudinally of the spindle and as indicated generally by the line 3—3 of FIG. 2; and
FIG. 4 is a horizontal sectional view taken generally as indicated by the line 4—4 of FIG. 2.

While this invention may be utilized to advantage in many machine tools adapted to rotate work in an out-of-balance condition, the invention has been shown as incorporated in a crankshaft grinding machine of the type that is schematically illustrated in FIG. 1. Such machine includes a head stock 10 and a generally similar tail stock 12 which are adapted to rotatably support a head stock spindle 14 and a tail stock spindle 16 on a common horizontal axis. A chuck mechanism 18 is connected with the inner end of each spindle and each such mechanism includes a chuck 20. The said chucks engage and grip the respective ends of a crankshaft, such as the crankshaft W, and it will be observed that the ends of a conventional crankshaft are formed on the axis of its main bearings M, M.

The essential elements of the chuck mechanism 18 comprise a chuck adjusting guideway 22 which may be provided in the form of an elongated dovetail base that is fixedly secured to the inner end of its associated spindle to extend radially rectilinearly from the spindle axis. A cooperating dovetail slide 24 is movable along the base 22 and it carries the associated chuck 20 and is adapted to be rigidly secured to the base 22 in any adjusted position. The base 22 and slide 24 are provided in sufficient size to permit locating the chuck 20 so that its horizontal axis will coincide with the axis of the associated spindle and so that the chuck can also be positioned by radial rectilinear movement relative to the spindle a substantial distance from the spindle axis.

The chucks holding the respective ends of the crankshaft are located on the common spindle axis to support the crankshaft W for grinding its main bearing M, M. This grinding operation is accomplished by rotating the stock spindles and thus rotating the crankshaft on the axis of its main bearings while engaging said main bearings with a rotating grinding wheel (not shown). Most conventional crankshafts are substantially in static and dynamic balance around the axis of their main bearings. This being the case, and if the chuck mechanism 18 is in substantial static and dynamic balance with the chuck on the spindle exis, the rotating mass of the chuck mechanisms and crankshaft will be in substantial balance and there will be no need for counterbalancing.

However, when it is desired to grind the crankshaft crankpins $C^1$, $C^1$ or $C^2$, $C^2$, it is necessary to move the chucks 20, 20 radially away from the spindle axis so that the crankshaft can be rotated on the axis of the crankpin or pins being ground. In FIG. 1, the chucks are shown in radially spaced relationship to the axis of the spindle so that when the spindles are rotated the chucks will orbit around the spindle axis to rotate the crankshaft W on the axis of the crankpins $C^1$, $C^1$ which can then be ground. Obviously, this "off center" disposition of the chuck mechanisms and the crankshaft causes their combined mass to be out of balance and it is desirable to counter balance this mass for proper and efficient operation.

In keeping with the present invention there is a counterbalancing mechanism 26 associated with each of the stocks 10 and 12 and the spindles 14 and 16. As shown in FIG. 1, each counterbalancing mechanism 26 is connected with the outer end of its associated spindle. The left hand counterbalancing mechanism 26 appears in FIG. 1 to be different from the similar right hand mechanism, but this is because the drive structure for the machine is associated with the left hand stock or head stock 10. More specifically, a drive motor 28 is mounted on the top of the head stock 10 and its drive shaft supports a pulley 30 to provide a belt drive for the head stock spindle 14 having a pulley 32 connected at its outer end between it and the associated counterbalancing mechanism 26. In the machine embodiment shown, the drive is transmitted from the head stock spindle 14 through the crankshaft W to the tail stock spindle 16, but it should be understood that an additional drive motor could be provided at the tail stock with a suitable pulley connection to the tail stock spindle.

Referring now to FIGS. 2 and 3, it will be seen that the head stock spindle 14 has a reduced diameter projecting outer end portion 34 surrounded at the shoulder thus formed by a seal 36 which is mounted on the outer face of the head stock 10. The pulley 32 is keyed to the reduced end 34 of the spindle immediately adjacent the seal 36, and in the preferred construction the said spindle is formed integrally with a counterweight frame 38. The counterweight frame 38 is a circular member having an elongated hub 40 which surrounds and is keyed to the spindle portion 34. Obviously, the counterweight frame 38 is a substantially balanced member. A similar counterweight frame is provided for the right hand counterbalancing mechanism 26, but the said right hand frame does not include an integrally formed pulley 32.

In keeping with the present invention, a pair of segment-shaped counterweights 42, 44 (FIG. 2) are supported by the frame 38 for rotational adjustment around the spindle portion 34. More specifically, the counterweight 42 is provided with a radially inner end portion 46 which embraces the frame hub 40 so that it can be rotated therearound and around the spindle. Similarly, the counterweight 44 is provided with a radially inner portion 48 which embraces the said hub and spindle. While radially outer or body portions of the counterweights 42 and 44 lie in substantially the same transverse plane with respect to the associated spindle, their radial inner portions are formed to reside in spaced apart parallel transverse planes. As best shown in FIG. 3, the radial inner portion 46 of the counterweight 42 is disposed adjacent the disk or flange portion of the counterweight frame 38, while the radial inner portion 48 of the counterweight 44 is spaced outwardly therefrom. An arcuate slot 50 is provided in the body portion of each of the counterweights to receive freely a nonrotatable bolt 52 projecting outwardly from the counterweight frame 26 through its associated counterweight where it is engaged by a cap nut 54. Obviously, by loosening the cap nut 54 on the bolt 52, the associated counterweight can be circumferentially adjusted around the spindle axis to a desired position. Then, by tightening the cap nut or binder nut 54, the said counterweight is clamped and secured in said position against the counterweight frame.

It is an additional feature of the present invention to provide easily manually operable gear means for moving the counterweights from one adjusted position to another. The said gear means includes a pair of gears 56, 56 each of which is secured to a respective one of the counterweights on the radially inner portion thereof so as to be rotated around the spindle portion 34. As shown in FIGS. 2 and 3, a gear 56 can be secured to its associated counterweight as by a screw 58 and dowel pins 60, 60.

The gears 56, 56 are engaged respectively by a pair of pinions 62, 64 (FIG. 4) which are rotatably supported in an open bottom gearbox 66 which is secured to the counterweight frame 38. More specifically, the pinion 62 is connected as by a pin 68 to a shaft 70 in the gearbox, the shaft having an outwardly extending wrench head 72 thereon. The pinion 64 is secured to a shaft 74 by a pin 76. As will be seen with reference to FIGS. 3 and 4, each pinion comprises a compound or multi-section pinion and the pinions engage each other while the pinion 62 meshes with the gear 56 secured to the counterweight segment 42 and the pinion 64 engages the gear 56 secured to the counterweight 44. Therefore, as the manually operable pinion 62 is rotated clockwise as viewed in FIG. 2 by the application of a wrench to the head 72 on shaft 70, the counterweight 42 will be moved counterclockwise with its gear 56. At the same time, the pinion 64 will be driven in a counterclockwise direction, and the counterweight 44 with which it is associated will be moved in a clockwise direction. Accordingly, it can be said that the aforedescribed manually operable gear means operates to move the counterweights 42 and 44 simultaneously but in opposite circumferential directions around the spindle axis.

Preferably, the counterweight frame 38 is keyed to the spindle end 34 in a preselected rotated position so that the pinion housing 66 is located in the same radial direction from the spindle axis in which the chuck base 22 extends from the spindle axis. Then, when the chuck 20 is adjusted off center as shown in FIG. 1 in the same radial direction in which the pinion housing 66 is disposed, the counterweights 42 and 44 can be moved toward the opposite radial location to most effectively counterbalance the weight of the off center chuck, crankshaft, etc. In the full line position for the counterweights 42 and 44 as shown in FIG. 2 wherein they are adjacent each other in diametrically opposed relationship to the pinions and the pinion housing, the said counterweights provide the greatest counterbalancing mass. In the broken line position for the counterweights shown in FIG. 2, they are disposed substantially in diametrically opposed relationship to each other and their counterbalancing effect is canceled by balancing their weights against each other. This is the position for the counterweights when the chuck is located on the spindle axis and the machine is in balance generally.

Accordingly, the counterweights can be circumferentially adjusted to any desired position between a position in which they are in diametrically opposed relationship and a position wherein they are adjacent each other on one side of the spindle axis. Obviously, the counterweights will not always be positioned in either of their extreme locations. To facilitate their location in intermediate positions, a protractor-type scale 80 is mounted on the counterweight frame 38 for association with each counterweight, there being two such scales provided. The counterweights are located with respect to the scales by viewing the scales over the top edges of the counterweights as they are shown in FIG. 2.

It is to be understood that a machine constructed in accordance with the present invention will be provided with counterweights 42 and 44 at each of its counterbalancing mechanisms 26, 26 that will be of sufficient weight to counterbalance the off center loads to be anticipated in the operation of the machine. However, additional weight can be added to the counterweight structures to balance greater than the anticipated or designed loads. This is illustrated in FIG. 3 wherein it is shown that an auxiliary weight or counterweight 82 can be secured to each counterweight segment by appropriate bolts threaded into the tapped holes 84, 84.

The invention claimed is:

1. In a machine tool of the type having a stock rotatably supporting a spindle; chuck mechanism including an adjustable chuck connected with the inner end of the spindle and which is so constructed and arranged that the chuck can engage work while located coaxially with the spindle and while radially spaced from the spindle axis; means for rotating the spindle, the chuck mechanism and any work supported thereby around the spindle axis comprising: improved means for counterbalancing the rotating structures comprising a counterweight frame surrounding and rotatable with the outer end portion of the spindle, a pair of segment-shaped counterweights adjustably supported on said frame and having radially inner ends for adjustment around the spindel axis to positions varying from a substantially diametrically opposed relationship to each other, wherein they balance the rotating structures with the chuck empty and located on the spindle axis, to a position wherein they are adjacent and balance the rotating structures with the chuck spaced from the spindle axis while supporting a workpiece, and manually operable gear means for moving said counterweights simultaneously but in opposite circumferential directions around the spindle axis.

2. A machine tool as set forth in claim 1 and wherein a protractor type scale is supported on the said frame to assist the circumferential adjustment of the counterweights to desired positions.

3. A machine tool as set forth in claim 1 wherein the said manually operable gear means comprises a pair of equal gears rotatable on the spindle and respectively secured to the counterweights, and a pair of equal pinions rotatably supported on the counterweight frame to mesh with each other and with each pinion meshing a respective one of the pair of gears, one of the said pinions being manually rotatable.

4. In a machine tool of the type having a stock rotatably supporting a spindle; chuck mechanism connected with the inner end of the spindle and including a chuck for gripping work and which is rectilinearly adjustable from a position coaxial with spindle to positions spaced from the spindle axis in a radial direction; means for rotating the spindle, the chuck mechanism and any work supported thereby around the spindle axis comprising: improved means for counterbalancing the rotating structures comprising a counterweight frame surrounding and rotatable with the outer end portion of the spindle, a pair of segment-shaped counterweights adjustably supported on said frame and each being secured to a respective one of a pair of gears, a pair of pinions rotatably supported on said frame in meshing relationship with each other and with each pinion in meshing relationship with a respective one of the said pair of gears, and one of the said pinions being adapted for manual rotation whereby the counterweights can be adjusted simultaneously and in opposite circumferential directions around the spindle axis to positions varying from a substantially diametrically opposed relationship to each other, wherein they balance the rotating structures with the chuck empty and located on the spindle axis, to a position wherein they balance the rotating structures and are adjacent and in substantially the opposite radial direction from the chuck when it is spaced from the spindle axis and supports a workpiece, and a protractor type scale supported on said frame to assist the circumferential adjustment of the counterweights to desired positions.

References Cited by the Examiner

UNITED STATES PATENTS

| | | | |
|---|---|---|---|
| 1,098,654 | 6/14 | Wilder | 74—603 |
| 1,315,380 | 9/19 | Martens | 74—604 |
| 1,515,034 | 11/24 | Griswold | 74—573 |
| 2,152,702 | 4/39 | Mansfield | 74—591 |
| 2,815,681 | 12/57 | Williams | 74—591 |
| 3,128,582 | 4/64 | Winther | 74—573 |

BROUGHTON G. DURHAM, *Primary Examiner.*